US012577411B2

(12) United States Patent
Itou et al.

(10) Patent No.: US 12,577,411 B2
(45) Date of Patent: Mar. 17, 2026

(54) GAS-BARRIER COATING COMPOSITION AND GAS-BARRIER LAMINATE

(71) Applicant: TOYO SEIKAN GROUP HOLDINGS, LTD., Tokyo (JP)

(72) Inventors: Midori Itou, Yokohama (JP); Tomohiro Miyai, Yokohama (JP); Kazuhiro Tsuruta, Yokohama (JP)

(73) Assignee: TOYO SEIKAN GROUP HOLDINGS LTD., Tokyo (JP)

( * ) Notice: Subject to any disclaimer, the term of this patent is extended or adjusted under 35 U.S.C. 154(b) by 741 days.

(21) Appl. No.: 17/914,123

(22) PCT Filed: Mar. 16, 2021

(86) PCT No.: PCT/JP2021/010658
§ 371 (c)(1),
(2) Date: Sep. 23, 2022

(87) PCT Pub. No.: WO2021/193247
PCT Pub. Date: Sep. 30, 2021

(65) Prior Publication Data
US 2023/0132536 A1 May 4, 2023

(30) Foreign Application Priority Data
Mar. 25, 2020 (JP) ................................ 2020-055007

(51) Int. Cl.
*C09D 5/08* (2006.01)
*B32B 7/12* (2006.01)
(Continued)

(52) U.S. Cl.
CPC ................ *C09D 5/08* (2013.01); *B32B 27/08* (2013.01); *B32B 27/32* (2013.01); *B32B 27/36* (2013.01);
(Continued)

(58) Field of Classification Search
CPC . C09D 5/08; C09D 7/61; C09D 139/02; C08J 7/048; C08J 7/042; B32B 27/08;
(Continued)

(56) References Cited

U.S. PATENT DOCUMENTS 3,821,014 A    6/1974  Haskell et al.
3,853,587 A   12/1974  Haskell, Jr. et al.
(Continued)

FOREIGN PATENT DOCUMENTS

CN          104349897 A      2/2015
CN          108912945 A     11/2018
(Continued)

OTHER PUBLICATIONS

International Search Report for PCT/JP2021/010658 dated Jun. 15, 2021 (PCT/ISA/210).
(Continued)

*Primary Examiner* — Shane Fang
(74) *Attorney, Agent, or Firm* — Sughrue Mion, PLLC

(57) ABSTRACT
The present invention relates to a gas-barrier coating composition containing a metal oxide, a phosphoric acid compound, and an amine compound. The present invention provides a gas-barrier film that features excellent oxygen-barrier property, excellent water vapor-barrier property as well as excellent transparency, and a gas-barrier laminate that includes the film.

7 Claims, 1 Drawing Sheet

Figure 1:

(51) Int. Cl.

| | |
|---|---|
| *B32B 27/08* | (2006.01) |
| *B32B 27/32* | (2006.01) |
| *B32B 27/36* | (2006.01) |
| *C08J 7/04* | (2020.01) |
| *C08J 7/048* | (2020.01) |
| *C08K 3/22* | (2006.01) |
| *C08K 3/32* | (2006.01) |
| *C09D 7/61* | (2018.01) |
| *C09D 139/02* | (2006.01) |

(52) U.S. Cl.
CPC .............. *C08J 7/042* (2013.01); *C08J 7/048* (2020.01); *C08K 3/22* (2013.01); *C08K 3/32* (2013.01); *C09D 7/61* (2018.01); *C09D 139/02* (2013.01); *B32B 7/12* (2013.01); *B32B 2250/24* (2013.01); *B32B 2255/10* (2013.01); *B32B 2255/20* (2013.01); *B32B 2255/26* (2013.01); *B32B 2255/28* (2013.01); *B32B 2307/518* (2013.01); *B32B 2307/7244* (2013.01); *B32B 2307/7246* (2013.01); *C08J 2323/12* (2013.01); *C08J 2439/02* (2013.01); *C08K 2003/2244* (2013.01); *C08K 2003/329* (2013.01); *C08K 2201/014* (2013.01)

(58) Field of Classification Search
CPC ........... B32B 27/32; B32B 27/36; B32B 7/12; B32B 2250/24; B32B 2255/10; B32B 2255/20; B32B 2255/26; C08K 3/22; C08K 3/32

See application file for complete search history.

(56) References Cited

U.S. PATENT DOCUMENTS

| | | | |
|---|---|---|---|
| 3,853,588 A | 12/1974 | Haskell et al. | |
| 3,853,591 A | 12/1974 | Haskell et al. | |
| 3,857,723 A | 12/1974 | Haskell et al. | |
| 3,885,079 A | 5/1975 | Haskell et al. | |
| 2002/0146527 A1* | 10/2002 | Kikuchi | B32B 27/08 428/35.7 |
| 2003/0152763 A1* | 8/2003 | Zhang | C03C 17/007 428/426 |
| 2013/0034674 A1 | 2/2013 | Yoshida et al. | |
| 2014/0248449 A1 | 9/2014 | Sasaki et al. | |
| 2014/0248450 A1 | 9/2014 | Sasaki et al. | |
| 2015/0086778 A1 | 3/2015 | Ryu et al. | |
| 2016/0096194 A1 | 4/2016 | Yoshida et al. | |

FOREIGN PATENT DOCUMENTS

| | | | |
|---|---|---|---|
| EP | 0 691 202 | B1 | 10/2005 |
| EP | 2 277 954 | A1 | 1/2011 |
| JP | 57-42032 | B2 | 9/1982 |
| JP | 4961054 | B2 | 6/2012 |
| JP | 2015-134957 | A | 7/2015 |
| JP | 2016-164215 | A | 9/2016 |
| JP | 2018-058280 | A | 4/2018 |
| JP | 2018-126971 | A | 8/2018 |
| WO | 2011/122036 | A1 | 10/2011 |
| WO | 2013/051286 | A1 | 4/2013 |
| WO | 2013/051288 | A1 | 4/2013 |

OTHER PUBLICATIONS

Extended European Search Report issued Mar. 12, 2024 in Application No. 21775015.7.
Notice of Reasons for Refusal issued Jun. 25, 2025, in Japanese patent application No. 2022-509984.

* cited by examiner

GAS-BARRIER COATING COMPOSITION AND GAS-BARRIER LAMINATE

CROSS REFERENCE TO RELATED APPLICATIONS

This application is a National Stage of International Application No. PCT/JP2021/010658 filed Mar. 16, 2021, claiming priority based on Japanese Patent Application No. 2020-055007 filed Mar. 25, 2020.

TECHNICAL FIELD

This invention relates to a gas-barrier coating composition containing, as constituent components, a metal oxide, a phosphoric acid compound, and an amine compound. More specifically, the invention relates to a coating composition having not only excellent oxygen-barrier properties and moisture-barrier properties but also excellent transparency and is capable of forming a film thereof, as well as to a gas-barrier laminate that includes the film.

BACKGROUND ART

There has heretofore been known a gas-barrier laminate obtained by forming, on a plastic base material, a film that contains metal atoms and phosphorus atoms as constituent components.

For example, Patent document 1 described below proposes a substantially continuous and substantially amorphous gas permeation-preventing film in which an atomic ratio of a metal to phosphorus is about 2.3 to 0.5, 50 to 100% of the metal atoms being aluminum, 0 to 50 of the metal atoms being selected from tin, titanium, and zirconium, and 0 to about 20'%, of the metal atoms being a metal orthophosphate selected from zinc, chromium, and magnesium.

However, the gas permeation-preventing film was not still satisfactory from the standpoint of oxygen-barrier property and water vapor-barrier property. Though Patent document 1 discloses addition of a resin in an attempt to improve the adhesion of the coating to the substrate, it fails to teach the effects of improving the oxygen-barrier property and water vapor-barrier property of the film by the addition of the resin. In order to solve these problems, Patent document 2 referred to below describes a composite structural body having a base material (X) and a layer (Y) laminated on the base material (X), the layer (Y) containing a reaction product (S) which is formed by the reaction of at least a metal oxide (A) and a phosphorus compound (B), the layer (Y) having an infrared absorption spectrum over a range of 800 to 1400 cm$^{-1}$ in which a fraction (n$^1$) at which the infrared absorption becomes maximal is in a range of 1080 to 1130 cm$^{-1}$, and the metal atoms (M) constituting the metal oxide (A) being aluminum.

PRIOR ART DOCUMENTS

Patent Documents

Patent document 1: JP-B-57-42032
Patent document 2: Japanese Patent No. 4961054

OUTLINE OF THE INVENTION

Problems that the Invention is to Solve

The composite structural body disclosed in Patent document 2 above satisfies both the oxygen-barrier property and the water vapor-barrier property. However, being chiefly constituted by aluminum, the composite structural body is still unsatisfactory in regard to safety against the acid and alkali possessed by the contents.

In order to solve these problems, the present inventors proposed a gas-barrier film using a specific zirconium compound (Japanese Patent Application No. 2019-152688). Further, the inventors have discovered the fact that upon further using specific additives, there can be obtained a gas-barrier coating composition of a metal oxide and a phosphoric acid compound, which is capable of foaming a film that exhibits more excellent oxygen-barrier property and water vapor-barrier property.

It is, therefore, an object of the present invention to provide a gas-barrier coating composition containing a metal oxide and a phosphoric acid compound, which is capable of forming a gas-barrier film that exhibits more excellent oxygen-barrier property, water vapor-barrier property and transparency, and to provide a gas-barrier laminate provided with the gas-barrier film (gas-barrier layer).

Means for Solving the Problems

According to the present invention, there is provided a gas-barrier coating composition characterized by containing a metal oxide, a phosphoric acid compound, and an amine compound.

In the gas-barrier coating composition of the present invention, it is desired that:

1. The amine compound is at least one of a polyamine compound, an amino sugar compound and an amino acid compound;
2. The amine compound is at least one of a polyallylamine, a polyethyleneimine, a chitosan, a glycine and an alginine;
3. The metal oxide is a zirconium oxide; and
4. The phosphoric acid compound is at least one of an orthophosphoric acid, a metaphosphoric acid, a polyphosphoric acid and a cyclic polyphosphoric acid.

According to the present invention, furthermore, there is provided a gas-barrier laminate characterized by having a film of the gas-barrier coating composition on a base material.

In the gas-barrier laminate of the present invention, it is desired that:

1. The film has such an absorption peak that an infrared absorption becomes maximal over a range of 1000 to 1050 cm$^{-1}$ in an infrared absorption spectrum thereof;
2. The film has such a peak that the bond energy of N becomes maximal over a range of 400 to 405 eV as measured by an XPS;
3. An anchor layer is provided between the base material and the film; and
4. The amount of oxygen permeation is not more than 25 cc/m$^2$·day·atm (40° C.90RH) and the amount of water vapor permeation is not more than 5.5 g/m$^2$·day ((40° C.90RH) when the base material is a 12 m-thick biaxially stretched polyester, the film is formed in an amount of 1.0 g/m$^2$ on the base material, and a 50 μm-thick unstretched polypropylene film is arranged on the film.

EFFECTS OF THE INVENTION

The gas-barrier coating composition of the present invention uses the metal oxide, the phosphoric acid compound and the amine compound. Here, the metal oxide particles are more easily dispersed assuming smaller particle sizes and, accordingly, a more homogeneously and densely crosslinked structure is created by the metal oxide and the phosphoric acid compound, making it possible to form a film that is capable of exhibiting excellent oxygen-barrier property and water vapor-barrier property. Besides, the amine compound, too, is taken into the crosslinked structure and hence works as a binder among the metal oxide particles. There is thus formed a film with less defect exhibiting more excellent oxygen-barrier property and water vapor-barrier property compounded by the formation of the above-mentioned homogeneously and densely crosslinked structure. Accordingly, the gas-barrier coating composition of the present invention is capable of providing a gas-barrier laminate that can be applied to both the non-retort uses and the retort sterilization.

Upon using a zirconium oxide as the metal compound, furthermore, it is allowed to form a film that remains stable even against the acid and alkali in the contents, making it, therefore, possible to express more excellent oxygen-barrier property and water vapor-barrier property. Brief Description of the Drawings:

FIG. 1 It is a view illustrating, in cross section, a structure of a gas-barrier laminate of the present invention.

Figure 2:
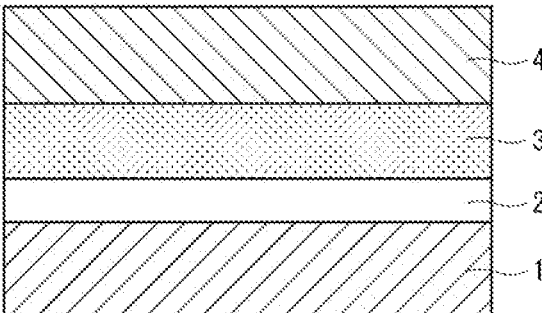

FIG. 2 It is a view illustrating, in cross section, another structure of the gas-barrier laminate of the present invention.

MODES FOR CARRYING OUT THE INVENTION (Gas-Barrier Coating Composition)

The gas-barrier coating composition of the present invention has an important feature in that it contains a metal oxide, a phosphoric acid compound, and an amine compound.

According to the present invention as described above, it was found that upon containing the metal oxide, the phosphoric acid compound as well as the amine compound, the film exhibits more excellent oxygen-barrier property and water vapor-barrier property than the film formed of a coating composition that contains the metal oxide and the phosphoric acid compound.

[Metal Oxides]

As the metal oxide used for the gas-barrier coating composition of the present invention, it is desired to use an oxide of metal atoms of a valence of 2 or higher. Though not limited thereto only, there can be used oxides of magnesium, calcium, iron, zinc, aluminum, silicon, titanium and zirconium. Among them, a zirconium oxide can be preferably used.

The zirconium oxide contains Zr and O as component elements. Here, the amorphous zirconium oxide contains a zirconium hydroxide ($Zr(OH)_4$) and/or a zirconyl hydroxide ($ZrO(OH)_2$) as main components whereas the crystalline zirconium oxide contains a hydrated zirconium oxide ($ZrO_2·xH2O$) and/or a zirconium oxide ($ZrO_2$) as main components. Here, the main components stand for the components that are contained at ratios of not less than 50%. The zirconium oxide and the zirconium oxide in the form of a gas-barrier film can be evaluated for their crystallinities by identifying X-ray peaks specific to the crystalline zirconium by using a widely known X-ray structure diffracting apparatus.

In the present invention, the zirconium oxide can be either a crystalline or amorphous zirconium oxide (zirconia).

According to the above-mentioned Japanese Patent Application No. 2019-152688 filed earlier by the present inventors, it is preferred to use, as the zirconium oxide, an amorphous zirconium oxide containing many hydroxyl groups used for the phosphorylation reaction. However, since it was found that a more homogeneous, dense defect-free film can be formed by adding an amine compound, even when a crystalline zirconium oxide is used, it is now made possible to realize both the oxygen-barrier property and the moisture-barrier property equivalent to those obtained when an amorphous zirconium is used.

Further, the zirconium oxide should have a mean primary particle size (D50) of not more than 100 nm, preferably, not more than 50 nm, and more preferably, not more than 30 nm. This makes it possible to form a homogeneous film excellent in transparency. Here, the mean particle size (D50) is a volume mean particle size as measured by the laser diffraction light scattering method, and D50 is a value at 50 on a volume-based particle size profile. By using the zirconium oxide of the type of fine particles as a starting material, it is made possible to realize excellent transparency.

[Phosphoric Acid Compounds]

As the phosphoric acid compound used for the present invention, there can be exemplified orthophosphoric acid, metaphosphoric acid, polyphosphoric acid, phosphorous acid, phosphonic acid and derivatives thereof. Concrete examples of the polyphosphoric acid include pyrophosphoric acid, triphosphoric acid and polyphosphoric acid in which four or more phosphoric acids are condensed. As the derivatives thereof, there can be exemplified salts, (partly) esterified compound, halides (chlorides, etc.), dehydrated products (diphosphorus pentoxide, etc.) and the like of orthophosphoric acid, metaphosphoric acid, polyphosphoric acid, phosphorous acid and phosphonic acid. As the derivatives of the phosphonic acid, further, there can be exemplified compounds substituted with an alkyl group in which a hydrogen atom directly bonded to a phosphorus atom of the phosphonic acid (H—P (=O)(OH)$_2$) may have various functional groups (e.g., nitrilotris(methylenephosphonic acid), N,N,N',N'-ethylenediaminetetrakis(methylenephosphonic acid), etc.), salts thereof, (partly) esterified compound, halides and dehydrated products. There can be, further, used organic high molecules having phosphorus atoms, such as phosphorylated starches. These phosphoric acid compounds can be used alone or in a combination of two or more kinds.

In the present invention, it is specifically desired to use at least one of orthophosphoric acid, metaphosphoric acid, polyphosphoric acid and cyclic polyphosphoric acid.

[Amine Compounds]

As the amine compound, the present invention uses a widely known amine compound such as monoamine, polyamine, polyamine compound, amino sugar compound or amino acid compound.

As the monoamines, though not limited thereto only, there can be exemplified primary amines such as methylamine, ethylamine, n-propylamine, isopropylamine, n-butylamine, isobutylamine, sec-butylamine, tert-butylamine, valerylamine, isovalerylamine, cyclohexylamine, benzylamine, and allylamine; secondary amines such as dimethylamine, methylethylamine, diethylamine, methylpropylamine, methylisopropylamine, ethylpropylamine, methylbutylamine, ethylbutylamine, di-n-propylamine, and diallylamine; and tertiary amines such as trimethylamine, triethylamine, dimethylethylamine, diethylmethylamine and diisopropylethylamine.

As the polyamines, though not limited thereto only, there can be exemplified diamines such as ethylenediamine, 1,2-propanediamine, trimethylenediamine, tetramethylenediamine, pentamethylenediamine, hexamethylenediamine, bis (dimethylamino)methane, N,N-dimethylethylenediamine, N,N'-dimethylethylenediamine, N-ethylethylenediamine, N-methyl-1,3-propanediamine, 1,3-diaminopentane, N-iso-propylethylenediamine, N-isopropyl-1,3-propanediamine, N,N,N',N'-tetramethylethylenediamine, N, N, N',N'-tetram-ethyltrimethylenediamine, N,N,N',N'-tetramethyl-1,2-pro-panediamine, N,N,2,2-tetramethyl-1,3-propanediamine, N, N, N',N'-tetramethyltetramethylenediamine, N,N-dimethyl-1,6-diaminohexane, N,N,N',N'-tetramethyl-2,2-dimethyl-1, 3-propanediamine, and N,N,N',N'-tetramethylhexamethyl-enediamine; and polyamines having three or more amino groups in the molecules, such as diethylenetriamine, bis(3-aminopropyl)amine, N-(3-aminopropyl)-1,3-propanedi-amine, 3,3'-diamino-N-methyldipropylamine, spermidine, N,N,N',N',N''-pentamethyldiethylenetriamine, 3,3'-iminobis (N, N-dimethylpropylamine), bis(hexamethylene)triamine, triethylenetriamine, N, N'-bis(3-aminopropyl)ethylenedi-amine, and tetraethylenepentamine.

As the polyamine compounds, there can be exemplified polyalkyleneimine, polydiallylamine, polyallylamine, poly-vinylamine, and polyethyleneimine. It is desired that the polyamine compound has a weight average molecular weight in a range of 1,600 to 25,000.

As the amino sugar compounds, there can be exemplified monosaccharides such as glucosamine, galactosamine, and mannosamine; and polysaccharides such as chitin and chi-tosan.

As the amino acid compounds, there can be exemplified $\alpha$-amino acids such as glycine, alanine, serine, tryptophane, glutamine, and alginine; $\beta$-amino acids such as $\beta$-alanine, etc.; $\gamma$-amino acids such as $\gamma$-aminobutyric acid, etc.; and polymers of amino acids, etc.

In the present invention, it is particularly desired to use at least one of polyallylamine, polyethyleneimine, chitosan, glycine, and alginine.

[Preparation of the Composition]

The gas-barrier coating composition of the present inven-tion is a composition of either the aqueous type or the solvent type so far as it contains the above-mentioned metal oxide, phosphoric acid compound and amine compound, but, preferably, is an aqueous composition.

For preparing the gas-barrier coating composition, it is desired that the metal oxide is used in the form of a sol in which fine metal oxide particles are present as a dispersed phase.

Moreover, though not essential for the invention that uses the amine compound, the metal oxide can also be used in the form of a dispersion solution which excels in transparency and viscosity stability by dispersing a sol in which fine metal oxide particles are present as a dispersed phase in the presence of a peptizer. As the peptizers, there can be exemplified nitric acid, hydrochloric acid, perchloric acid, formic acid, acetic acid, citric acid, malic acid, and lactic acid. Among them, it is desired to use the acetic acid, hydrochloric acid, nitric acid or citric acid in the form of a dispersion solution. By using the dispersion solution, the metal oxide can be easily and homogeneously dispersed in the gas-barrier coating composition or in a gas-barrier film formed by using the gas-barrier coating composition.

When the nitric acid (concentration=1 mol/L) is used as the peptizer (concentration=1 mol/L), it is desired that the nitric acid is added in an amount of 0.01 to 30 g and, specifically, 2.68 to 5.36 g per 21.9 g of the sol in which the Zirconium oxide is present as a dispersed phase.

Next, the phosphoric acid compound, amine compound and zirconium oxide are mixed together in a solvent that is capable of dissolving the phosphoric acid compound and amine compound.

As the aqueous medium, there can be used any known aqueous medium such as distilled water, ion-exchanged water or pure water. Like the known aqueous compositions, the aqueous medium can contain an organic solvent such as alcohol, polyhydric alcohol or a derivative thereof. Such a cosolvent can be used in an amount of 1 to 90% by weight per the resin components in the aqueous composition. Upon containing the solvent in amounts in the above-mentioned range, the film formability improves. The organic solvents should, preferably, be amphoteric. Examples thereof include methyl alcohol, ethyl alcohol, isopropyl alcohol, n-butanol, methyl ethyl ketone, butyl cellosolve, propylene glycol monopropyl ether, ethylene glycol monobutyl ether, propyl-ene glycol monomethyl ether, propylene glycol monobutyl ether, dipropylene glycol monomethyl ether, dipropylene glycol monobutyl ether, tripropylene glycol monomethyl ether, and 3-methyl 3-methoxybutanol.

In preparing the gas-barrier coating composition of the present invention, the phosphoric acid compound and amine compound can be added in amounts in ranges in which they do not impair the oxygen-barrier property and water vapor-barrier property. The phosphoric acid compound is desirably added in such an amount that a net intensity ratio P (P-k$\alpha$)/M (M-k$\alpha$) of the metal oxide and the phosphoric acid com-pound lies in a range of 0.5 to 10 in the fluorescent X-ray measurement. When the zirconium oxide is used as the metal oxide, the phosphoric acid compound is desirably used in such an amount that the net intensity ratio P (P-k$\alpha$)/Zr (Zr-k$\alpha$) of the zirconium oxide and the phosphoric acid compound lies in a range of 2.8 to 8.0 and, specifically, 2.8 to 7.1 in the fluorescent X-ray measurement.

In preparing the gas-barrier coating composition, further-more, the amine compound is desirably added in an amount of 0.1 to 100 parts by mass and, specifically, 1.0 to 40 parts by mass per 100 parts by mass of the metal oxide though dependent on the kind of the amine compound that is used. When the amount of addition thereof is smaller than the above range, the actions and effects resulting from the addition of the amine compound are not sufficient as com-pared to those obtained when the amount of addition is within the above-mentioned range. Even when the amount of addition thereof is larger than the above range, on the other hand, no improved effects are obtained and, besides, the barrier structure of the film may become defective as compared to that obtained when the amount of addition thereof is within the above-mentioned range.

In addition to the above-mentioned components, the gas-barrier coating composition can still contain a crosslinking agent, metal complex, high molecular compound, filler, plasticizer, antioxidant, ultraviolet ray absorber, flame retar-dant, coloring agent, etc.

(Gas-barrier film)

The gas-barrier film formed of the gas-barrier coating composition of the present invention comprises the above-mentioned metal oxide, phosphoric acid compound and amine compound. Concretely speaking, the gas-barrier film forms a complex structure in which a phosphoric acid ester bond is formed, the metal oxide and the phosphoric acid compound are crosslinked, and the amine compound forms an ammonium salt compound upon being reacted with metal ions and phosphoric acid.

Therefore, the film formed of the gas-barrier coating composition of the present invention has a feature in that it has such an absorption peak that the infrared absorption becomes maximal in a range of 1000 to 1050 cm$^{-1}$ in the infrared absorption spectrum in a range of 800 to 1400 cm$_{-1}$ in the FT-IR measurement of the film and, further, has another feature in that it has a maximum peak in a range of the bond energy (400 to 405 eV) of nitrogen (N) in the X-ray photoelectron spectroscopy (XPS) of the gas-barrier film.

It is, further, desired that the film of the gas-barrier coating composition of the present invention has a net intensity ratio P (P-kα)/M (M-kα) of the metal oxide and the phosphoric acid compound of 0.5 to 10, and, when the metal oxide is the zirconium oxide, in a range of 2.8 to 8.0 and, specifically, 2.8 to 7.1 in the fluorescent X-ray measurement. When the net intensity ratio P (P-kα)/M (M-kα) lies in the above-mentioned range, the phosphoric acid compound adequately and efficiently reacts with the hydroxyl groups of the metal oxide in the film, enabling the film to become homogeneous and dense, and hence enabling the film to exhibit excellent oxygen-barrier property and water vapor-barrier property. That is, when the net intensity ratio in the fluorescent X-ray measurement is smaller than the above range and the phosphoric acid compound is deficient in amount, the metal particles do not bond to each other to a sufficient degree, and the amount of the hydroxyl groups increases on the surfaces of the metal particles, whereby the oxygen-barrier property and water vapor-barrier property may decrease. On the other hand, when the net intensity ratio in the fluorescent X-ray measurement is larger than the above range, and the phosphoric acid compound is excess in amount, the amount of the hydroxyl groups derived from the phosphoric acid increases, and in this case, too, the oxygen-barrier property and water vapor-barrier property may decrease.

(Gas-Barrier Laminate)

The gas-barrier laminate of the present invention is a laminate having a gas-barrier layer formed of the above-mentioned gas-barrier film on at least one surface of a base material. Preferably as shown in FIG. 1, the gas-barrier laminate has a gas-barrier layer 3 formed on a base material 1 via an anchor layer 2 that will be described later. The anchor layer 2 is a film that excellently adheres to the plastic base material 1. With the gas-barrier layer being formed on the film, the interlayer adhesion improves greatly between the gas-barrier layer and the plastic base material. Even when the laminate is subjected to retort sterilization, therefore, removal of the gas-barrier layer from the base material is effectively prevented.

In the gas-barrier laminate of the present invention as shown in FIG. 2, furthermore, a moisture-proof resin layer 4 of a thermoplastic resin such as an unstretched polypropylene resin film can be preferably formed on the gas-barrier layer 3.

In the gas-barrier laminate of the present invention, the gas-barrier layer itself has a sufficient degree of gas-barrier property and, specifically, oxygen-barrier property and water vapor-barrier property. When the gas-barrier laminate comprises a base material film of 12 μm-thick biaxially stretched polyester, a gas-barrier film formed thereon by being applied in an amount of 1.0 g/m$^2$, and an unstretched polypropylene film of a thickness of 50 μm, excellent oxygen-barrier property and retort resistance are exhibited with an oxygen permeation amount (in compliance with JIS K-7126) of not more than 25 cc/m$^2$·day·atm (40° C. 90% RH) and a water vapor permeation amount of not more than 5.5 g/m$^2$·day (40° C. 90% RH).

The thus constituted gas-barrier laminate, further, exhibits excellent transparency with a total light ray transmittivity of not less than 85% and a haze of not more than 30%.

[Base Material]

As the base material of the gas-barrier laminate, there can be used any known base material of a resin such as thermoplastic resin or thermosetting resin, or a fiber such as paper or nonwoven fabric. Preferably, there can be used a film or a sheet made from a thermoformable thermoplastic resin through such means as extrusion forming, injection forming, blow forming, stretch-blow forming, or press forming. Or there can be used any packing material in the form of bottle, cup, tray, can, etc.

As the thermoplastic resin for constituting the base material, there can be exemplified olefin type copolymers such as low-, medium- or high-density polyethylene, linear low-density polyethylene, polypropylene, ethylene-propylene copolymer, ethylene-butene copolymer, ionomer, ethylene-vinyl acetate copolymer, and ethylene vinyl alcohol copolymer; polyesters such as polyethylene terephthalate, polybutylene terephthalate, polyethylene terephthalate/isophthalate, and polyethylene naphthalate; polyamides such as nylon 6, nylon 6,6, nylon 6,10, and metaxylyleneadipamide; styrene type copolymers such as polystyrene, styrene-butadiene block copolymer, styrene-acrylonitrile copolymer, and styrene-butadiene-acrylonitrile copolymer (ABS); vinyl chloride type copolymers such as polyvinyl chloride and vinyl chloride-vinyl acetate copolymer; acrylic type copolymers such as polymethyl methacrylate and methyl methacrylate ethyl acrylate copolymer; and polycarbonates.

The invention particularly preferably uses a sheet of polyethylene terephthalate, polybutylene terephthalate or polypropylene.

These thermoplastic resins may be used alone or as a blend of two or more kinds thereof. Or a different resin may be made present in the form of a laminate. The plastic base material may assume a single layer constitution or may be a laminate of two or more layers obtained by, for example, simultaneous melt extrusion or by any other lamination.

The thermoplastic resin that is melt-formable can be blended, as required, with one or two or more kinds of additives such as pigment, antioxidant, antistatic agent, ultraviolet absorber and lubricant in a total amount in a range of 0.001 parts to 5.0 parts per 100 parts by mass of the resin.

In order to reinforce the container, furthermore, the thermoplastic resin can be, further, blended with one or two or more of a fibrous reinforcing material such as glass fiber, aromatic polyamide fiber, carbon fiber, pulp, or cotton linter; a powdery reinforcing material such as carbon black or white carbon; and a flaked reinforcing material such as glass flakes or aluminum flakes in a total amount of 2 to 150 parts by mass per 100 parts by mass of the thermoplastic resin. In order to increase the quantity, furthermore, the thermoplastic resin can be blended with one or two or more kinds of heavy or soft calcium carbonate, mica, talc, kaolin, gypsum, clay, barium sulfate, alumina powder, silica powder, and magnesium carbonate in a total amount of 5 to 100 parts by mass per 100 parts by mass of the thermoplastic resin according to a recipe known per se.

In order to improve the gas-barrier property, furthermore, the thermoplastic resin can be blended, without any problem, with a scale-like inorganic fine powder such as water swelling mica or clay in a total amount of 5 to 100 parts by mass per 100 parts by mass of the thermoplastic resin according to a recipe known per se.

Similarly, in order to improve the gas-barrier property, an inorganic thin layer of a silicon oxide or aluminum oxide may be provided on the plastic base material by a physical or chemical vapor phase deposition method.

The base material may be a formed article such as a final film, sheet or container, or a preform to be formed into a container on which the film is formed in advance. Examples of the preform include a bottomed or non-bottomed cylindrical parison that is to be put to the biaxial draw-blow forming, a pipe that is to be formed into plastic cans, a sheet that is to be put to the vacuum forming, air pressure forming or plug-assist forming, a heat-sealing lid, and a film for forming bags.

[Anchor Layer]

As the anchor layer which, as required, is formed on the surface of the base material, there can be used a widely known anchor layer of a polyurethane type resin comprising polyol and isocyanate compound, which has been used for the gas-barrier laminates. It is, however, preferred to use the anchor layer comprising a polyurethane type resin and a silane coupling agent, which has been proposed by the present inventors.

<Polyurethane Type Resins>

As the polyurethane type resin for constituting the anchor layer, there can be used a known polyurethane type resin that has heretofore been used as the anchor layer. According to the present invention, however, it is desired to use the polyurethane type resin having a glass transition temperature (Tg) of not lower than 80° C.; and, specifically, in a range of 80 to 120° C. When the glass transition temperature is lower than the above-mentioned range, the heat resistance of the anchor layer tends to become inferior to that obtained when the glass transition temperature lies in the above-mentioned range and, besides, the gas-barrier layer tends to be cracked and the barrier property decreases when the coefficient of contraction becomes different between the anchor layer and the gas-barrier layer due to the heating.

As the polyol component which is the main component in the polyurethane type resin, there can be exemplified glycol, polyesterpolyol, polyetherpolyol, acrylic polyol, and urethane-modified products thereof. Here, however, it is specifically desired to use the glycol.

The polyesterpolyol should have a glass transition temperature of, preferably, −50° C. to 100° C. and, more preferably, −20° C. to 80° C. Further, the polyesterpolyol should have a number average molecular weight of, preferably, 50 to 100,000 and, more preferably, 50 to 80,000.

As the glycol, there can be exemplified ethylene glycol, propylene glycol, diethylene glycol, butylene glycol, neopentyl glycol, and 1,6-hexanediol.

As the polycarboxylic acid, there can be exemplified aromatic polycarboxylic acids such as isophthalic acid, terephthalic acid and naphthalenedicarboxylic acid, as well as aliphatic polycarboxylic acids such as adipic acid, azelaic acid, sebacic acid, and cyclohexanedicarboxylic acid.

As the isocyanate component which is a curing agent for the polyurethane type resin, there can be used aromatic diisocyanate, alicyclic diisocyanate or aliphatic diisocyanate.

As the aromatic diisocyanate, there can be exemplified tolylenediisocyanate (2,4- or 2,6-tolylenediisocyanate or a mixture thereof) (TDI), phenylenediisocyanate (m-, p-phenylenediisocyanate or a mixture thereof), 4,4′-diphenyldiisocyanate, 1,5-naphthalenediisocyanate (NDI), diphenylmethanediisocyanate (4,4′-, 2,4′-, or 2,2′-diphenylmethanediisocyanate or a mixture thereof) (MDI), 4,4′-toluidinediisocyanate (TODI), and 4,4′-diphenyletherdiisocyanate.

As the aromatic-aliphatic diisocyanate, there can be exemplified xylenediisocyanate (1,3- or 1,4-xylenediisocyanate or a mixture thereof) (XDI), tetramethylxylenediisocyanate (1,3- or 1,4-tetramethylxylenediisocyanate or a mixture thereof) (TMXDI), and ω,ω′-diisocyanate-1,4-diethylbenzene.

As the alicyclic diisocyanate, there can be exemplified 1,3-cyclopentenediisocyanate, cyclohexanediisocyanate (1,4-cyclohexanedisocyanate, 1,3-cyclohexanediisocyanate), 3-isocyanatemethyl-3,5,5-trimethylcyclohexylisocyanate (isophoronediisocyanate, IPDI), methylenebis(cyclohexylisocyanate) (4,4′-, 2,4′- or 2,2′-methylenebis (cyclohexylisocyanate)) (hydrogenated MDI), methylcyclohexanediisocyanate (methyl-2,4-cyclohexanediisocyanate, methyl-2,6-cyclohexanediisocyanate), and bis (isocyanatemethyl) cyclohexane (1,3- or 1,4-bis (isocyanatemethyl) cyclohexane or a mixture thereof) (hydrogenated XDI).

As the aliphatic diisocyanate, there can be exemplified trimethylenediisocyanate, 1,2-propylenediisocyanate, butylenediisocyanate (tetramethylenediisocyanate, 1,2-butylenediisocyanate, 2,3-butylenediisocyanate, 1,3-butylenediisocyanate), hexamethylenediisocyanate, pentamethylenediisocyanate, 2,4-,4- or 2,2,4-trimethylhexamethylenediisocyanate, and 2,6-diisocyanatemethylcaffate.

As the polyisocyanate component, there can be used a polyfunctional polyisocyanate compound such as isocyanurate derived from the above-mentioned polyisocyanate monomer, burette or allophanate, or a polyfuntional polyisocyanate compound having a terminal isocyanate group obtained by the reaction with a trifunctional or more highly functional polyol compound such as trimethylolpropane or glycerine.

It is desired that the polyisocyanate component has a glass transition temperature (Tg) of not lower than 50° C. and a number average molecular weight (Mn) of not smaller than 400 and, specifically, a glass transition temperature (Tg) of not lower than 60° C. and a number average molecular weight (Mn) of not smaller than 500.

Among the above-mentioned isocyanate components, the present invention preferably uses the xylenediisocyanate.

<Silane Coupling Agent>

As the silane coupling agent used for the anchor layer, there can be preferably used an epoxysilane type coupling agent.

As the epoxysilane type coupling agent, there can be used β-(3,4-epoxycyclohexyl)ethyltrimethoxysilane, 3-glycidoxypropylmethyldimethoxysilane, 3-glycidoxypropylmethyldiethoxysilane, 3-glycidoxypropyltriethoxysilane and 3-glycidoxypropyltrimethoxysilane.

As the silane coupling agent, there can be further exemplified tetramethoxysilane, tetraethoxysilane, 3-aminopropyltrimethoxysilane, 3-aminopropyltriethoxysilane, and 3-isocyanatepropyltriethoxysilane, which can be used as required.

Moreover, the silane coupling agent to be used in the invention may, as required, be hydrolyzed and condensation-reacted from the standpoint of improving resistance against the hot water and close adhesion.

[Composition for Forming the Anchor Layer]

According to the present invention, it is desired that the composition for forming the anchor layer contains the above-mentioned polyurethane type resin and the silane coupling agent. The composition for forming the anchor layer may be either the aqueous type or the solvent type but is preferably the aqueous composition. Accordingly, the polyurethane type resin to be used should desirably be soluble in water or dispersible in water.

It is desired that the composition for forming the anchor layer contains the epoxysilane compound in an amount of 1 to 60 parts by mass per 100 parts by mass of the polyurethane type resin (solid component). When the amount of the epoxysilane compound is smaller than the above-mentioned range, satisfactory anti-cracking property cannot be attained during the drying as compared to the case in which the amount thereof is within the above-mentioned range. Even when the amount of the epoxysilane compound is larger than the above-mentioned range, on the other hand, more improved adhesiveness cannot be attained but rather the resistance against the hot water may often decrease.

The aqueous medium can be a widely known aqueous medium like the one that has been used for the compositions for forming the gas-barrier layers, and can contain an organic solvent such as alcohol, polyhydric alcohol or a derivative thereof.

In addition to the above-mentioned components, the composition for forming the anchor layer can contain widely known cure accelerating catalyst, filler, softening agent, anti-aging agent, stabilizer, adhesion promoting agent, leveling agent, defoaming agent, plasticizer, inorganic filler, tackiness-imparting resin, fibers, coloring agent such as pigment, and usable time extender.

(Method of Producing the Gas-Barrier Laminate)

In the method of producing the gas-barrier laminate according to the present invention, the gas-barrier coating composition of the invention can be applied directly onto at least one surface of the above-mentioned base material. It is, however, preferred to apply the above-mentioned composition for forming the anchor layer prior to applying the gas-barrier coating composition.

The amount of applying the composition for forming the anchor layer is determined depending on the amounts of the polyurethane type resin and silane coupling agent in the composition, and cannot be exclusively specified. Desirably, however, the composition for forming the anchor layer is applied in an amount in a range of 0.05 to 1.00 g/m$^2$ and, specifically, 0.10 to 0.50 g/m$^2$ in terms of the solid weight of the film. When the amount of applying the anchor layer is smaller than the above-mentioned range, the anchor layer cannot often be firmly fixed to the base material as compared with the case in which the amount thereof is within the above-mentioned range. When the amount of applying the anchor layer is larger than the above-mentioned range, on the other hand, it becomes economically disadvantageous.

Though dependent upon the composition that is used and the amount applied, the composition for forming the anchor layer applied onto the base material is dried at a temperature of 80 to 140° C. for 1 to 60 seconds to remove the solvent from the composition. Thus the anchor layer can be economically formed even when the base material is made of a plastic material having a low melting point like polypropylene.

Next, the gas-barrier coating composition is applied onto the composition for forming the anchor layer which is in a dry state after the solvent has been removed therefrom. The amount of applying the gas-barrier coating composition is determined depending on the amounts of the metal oxide, phosphoric acid compound and amine compound in the composition, and cannot be exclusively specified. Desirably, however, the gas-barrier coating composition is applied in an amount in a range of 0.05 to 2.0 g/m$^2$ and, specifically, 0.3 to 1.5 g/m$^2$ in terms of the solid weight of the film. When the amount of applying the coating composition is smaller than the above-mentioned range, the barrier property is not obtained to a sufficient degree. Even when the amount of applying the coating composition is larger than the above-mentioned range, no particular advantage is obtained, but rather it results in an economic disadvantage.

Next, though dependent upon the ratio of the metal oxide, phosphoric acid composition and amine compound in the composition and the amount of applying the composition, the gas-barrier coating composition is heated at a temperature of 80° C. to 220° C. and, specifically, 140° C. to 220° C. for 1 second to 10 minutes thereby to form the gas-barrier layer. This makes it possible to decrease a difference in the contraction between the gas-barrier layer and the anchor layer caused by the heating and hence to improve the anti-cracking property of the gas-barrier layer as well as to greatly improve close adhesion between the gas-barrier layer and the anchor layer. Therefore, removal of the gas-barrier layer from the base material is prevented even when the laminate is subjected to retort sterilization.

The above-mentioned composition for forming the anchor layer and the gas-barrier coating composition can be applied and dried or heat-treated according to conventional methods.

The method of application can be, though not limited thereto only, spray coating, immersion or application using a bar coater, roll coater or gravure coater.

The drying or the heat treatment can be executed by oven drying (heating), infrared heating, or high-frequency heating.

EXAMPLES

The present invention will now be described in further detail with reference to the following Examples; however, the invention is in no way limited thereto. In the Examples and Comparative Examples, measurements and evaluations were made by the methods described below.

Example 1

As the metal oxide, there was used a zirconium oxide sol (Zirconia Sol, ZSL-10T, amorphous zirconium oxide, solid component (calculated as $ZrO_2$)=10%%, produced by Daiichi Kigenso Kagaku Kogyo Co.). Then by using a water/methanol solvent, the sol was so adjusted that the solid component was 3.3%; and the ratio of water/methanol was 65/35. There were, further, added a nitric acid (concentration=1 mol/L, produced by Wako-Junyaku Co.) as the peptizer in an amount of 5.36 g per 21.9 g of the zirconium oxide sol (solid component (calculated as $ZrO_2$)=10%), a polyallylamine (PAA-25, concentration=10%, weight average molecular weight M.W.=25,000, produced by Nittobo Medical Co.) as the amine compound in an amount of 7.5 phr relative to the solid component (calculated as $ZrO_2$) of the zirconium oxide sol, and a phosphoric acid (concentration=85%, produced by Wako-Junyaku Co.) as the phosphoric acid compound in such an amount that the nonvolatile component of the phosphoric acid was 136 phr relative to the solid component (calculated as $ZrO_2$) of the zirconium oxide sol. The mixture thereof was stirred for a predetermined period of time to obtain a gas-barrier coating composition.

(Method of Preparing Samples of the Gas-Barrier Laminate)

By using the gas-barrier coating composition prepared above, a sample of the gas-barrier laminate was prepared in a manner as described below. By using a bar coater, the gas-barrier coating composition was applied onto the base material of a 12 μm-thick biaxially stretched polyester film (Lumirror P60, produced by Toray Film Kako Co.) in an amount of 1.0 g/m$^2$ followed by heating and drying in a box oven at a temperature of 220° C. for 10 minutes thereby to prepare a sample of the gas-barrier laminate.

(Method of Preparing Samples of the Laminate for Evaluating the Gas-Barrier Properties)

A sample of the laminate for evaluating the gas-barrier properties was prepared by applying, by using the bar coater, an urethane type adhesive (Takenate A-315/Takenate A-50, produced by Mitsui Kagaku Co.) onto the surface of the gas-barrier laminate where the gas-barrier coating composition has been applied, followed by drying by using a dryer. Thereafter, a 50 μm-thick unstretched polypropylene film (Torayfan ZK401, produced by Toray Film Kako Co.) was laminated thereon to prepare the gas-barrier laminate described in Example 1.

Example 2

A gas-barrier laminate and a laminate for evaluating the gas-barrier properties were prepared in the same manner as in Example 1 but by adding, as the amine compound for the gas-barrier coating composition, a polyallylamine (PAA-01, concentration=10%, weight average molecular weight M.W.=1,600, produced by Nittobo Medical Co.) in an amount of 7.5 phr.

Example 3

A gas-barrier laminate and a laminate for evaluating the gas-barrier properties were prepared in the same manner as in Example 1 but by adding, as the phosphoric acid compound for the gas-barrier coating composition, a nonvolatile component of a phosphoric acid (concentration=75%, produced by Wako-Junyaku Co.) in an amount of 110 phr.

Example 4

A gas-barrier laminate and a laminate for evaluating the gas-barrier properties were prepared in the same manner as in Example 1 but by adding, as the phosphoric acid compound for the gas-barrier coating composition, the nonvolatile component of the phosphoric acid (concentration=75%, produced by Wako-Junyaku Co.) in an amount of 120 phr.

Example 5

A gas-barrier laminate and a laminate for evaluating the gas-barrier properties were prepared in the same manner as in Example 1 but by adding, as the phosphoric acid compound for the gas-barrier coating composition, the nonvolatile component of the phosphoric acid (concentration=75%, produced by Wako-Junyaku Co.) in an amount of 123 phr.

Example 6

A gas-barrier laminate and a laminate for evaluating the gas-barrier properties were prepared in the same manner as in Example 1 but by adding, as the phosphoric acid compound for the gas-barrier coating composition, the nonvolatile component of the phosphoric acid (concentration=75%, produced by Wako-Junyaku Co.) in an amount of 140 phr.

Example 7

A gas-barrier laminate and a laminate for evaluating the gas-barrier properties were prepared in the same manner as in Example 1 but by adding, as the amine compound for the gas-barrier coating composition, a polyethyleneimine (weight average molecular weight M.W.=10,000, produced by Wako-Junyaku Co.) in the form of a 10% aqueous solution in an amount of 15 phr.

Example 8

A gas-barrier laminate and a laminate for evaluating the gas-barrier properties were prepared in the same manner as in Example 1 but by adding, as the amine compound for the gas-barrier coating composition, a glycine (produced by Wako-Junyaku Co.) in the form of a 10%% aqueous solution in an amount of 15 phr.

Example 9

A gas-barrier laminate and a laminate for evaluating the gas-barrier properties were obtained in the same manner as in Example 1 but by adding, as the amine compound for the gas-barrier coating composition, a D-alginine (produced by Wako-Junyaku Co.) in the form of a 10%% aqueous solution in an amount of 15 phr.

Example 10

A gas-barrier laminate and a laminate for evaluating the gas-barrier properties were obtained in the same manner as in Example 1 but by adding, as the amine compound for the gas-barrier coating composition, an L-alginine (produced by Wako-Junyaku Co.) in the form of a 10% aqueous solution in an amount of 15 phi.

Example 11

A gas-barrier laminate and a laminate for evaluating the gas-barrier properties were obtained in the same manner as in Example 1 but by adding no peptizer to the gas-barrier coating composition.

Example 12

As the metal oxide, there was used a zirconium oxide sol (Zirconia Sol, ZSL-00120A, crystalline zirconium oxide, solid component ((calculated as $ZrO_2$)=30%, produced by Daiichi Kigenso Kagaku Kogyo Co.). Then by using a water/methanol solvent, the sol was so adjusted that the solid component was 3.0 and the ratio of water/methanol was 65/35. There were, further, added a polyallylamine (PAA-25, concentration=10%, weight average molecular weight M.W.=25,000, produced by Nittobo Medical Co.) as the amine compound in an amount of 7.5 phr relative to the solid component (calculated as $ZrO_2$) of the zirconium oxide sol, and a phosphoric acid (concentration=85%, produced by Wako-Junyaku Co.) as the phosphoric acid compound in such an amount that the nonvolatile component of the phosphoric acid was 58 phr relative to the solid component (calculated as $ZrO_2$) of the zirconium oxide sol. The mixture thereof was stirred for a predetermined period of time to thereby prepare a gas-barrier coating composition. The gas-barrier laminate and the laminate for evaluating the gas-barrier properties were prepared in the same manner as in Example 1.

Comparative Example 1

A gas-barrier laminate and a laminate for evaluating the gas-barrier properties were prepared in the same manner as in Example 1 but by adding, as the peptizer for the gas-barrier coating composition, the nitric acid (concentration=1 mol/L, produced by Wako-Junyaku Co.) in an amount of 2.68 g per 21.9 g of the Zirconium oxide sol (solid component (calculated as $ZrO_2$)=10%) and adding no amine compound.

Comparative Example 2

A gas-barrier laminate and a laminate for evaluating the gas-barrier properties were prepared in the same manner as in Example 1 but by adding, as the phosphoric acid compound for the gas-barrier coating composition, the nonvolatile component of the phosphoric acid (concentration=85%, produced by Wako-Junyaku Co.) in an amount of 159 phr.

Comparative Example 3

A gas-barrier laminate and a laminate for evaluating the gas-barrier properties were prepared in the same manner as in Example 12 but by adding, as the peptizer for the gas-barrier coating composition, the nitric acid (concentration=1 mol/L, produced by Wako-Junyaku Co.) in an amount of 5.36 g per 21.9 g of the zirconium oxide sol (solid component (calculated as $ZrO_2$)=10%), adding no amine compound, and adding, as the phosphoric acid compound, the nonvolatile component of the phosphoric acid (concentration=85%, produced by Wako-Junyaku Co.) in an amount of 97 phr.

Reference Example 1

A laminate for evaluating the gas-barrier properties was prepared in the same manner as in Example 1 but by using, as the base material, the 12 μm-thick biaxially stretched polyester film (Lumirror P60, produced by Toray Film Kako Co.) without applying the gas-barrier coating composition thereon.

(Methods of Evaluation)

The gas-barrier laminates and the laminates for evaluating the gas-barrier properties were evaluated by the methods of evaluation described below to obtain the results of evaluation as shown in Table 1.

[Oxygen Permeability]

The laminates for evaluating the gas-barrier properties prepared in Examples, Comparative Examples and Reference Example were measured for their properties by using an oxygen permeability measuring apparatus (OX-TRAN 2/21, manufactured by Modern Control Co.) under the conditions of a temperature of 40° C.; and a relative humidity of 90's.

[Water Vapor Permeability]

The laminates for evaluating the gas-barrier properties prepared in Examples, Comparative Examples and Reference Example were measured for their properties by using a water vapor permeability measuring apparatus (PERMA-TRAN-W 3/31, manufactured by Modern Control Co.) under the conditions of a temperature of 40° C. and a relative humidity of

[Optical Properties]

The gas-barrier laminates prepared in Examples, Comparative Examples and Reference Example were measured, by using a color computer (SM-4, manufactured by Suga Shikenki Co.), for their total light ray transmittivities (TT: s) and hazes (Hz: %) in a manner that the light for measurement was incident on the polyester film base material.

[Infrared Absorption Spectra]

For the gas-barrier laminates prepared in Examples and Comparative Examples, the gas-barrier films applied onto the polyester base materials were measured for their infrared absorption spectra by using a Fourier transform infrared spectrophotometer (FT/IR-6600, manufactured by Nihon Bunkoh Co.).

<Measuring Conditions for the FT-IR Apparatus>
  Apparatus: FT/IR-6600 manufactured by JASCO
  Measuring conditions:
  Method ATR (Ge prism)
  Detector MCT Attachment Thunder Dome
Range of wave numbers 800 to 1400 $cm^{-1}$
Surface of film measured surface where barrier coating was applied

[Fluorescent X-Ray Evaluation]

As a method of evaluating the elements contained in the gas-barrier laminates prepared in Examples and Comparative Examples, the phosphorus element and the zirconium element can be determined by using a commercially available fluorescent X-ray analyzer. Net intensities of the elements obtained from the measurement of the gas-barrier laminates can be picked up for P and Zr and expressed as P/Zr to calculate the ratio of contents of metal elements in the film for use in the evaluation.

<Measuring Conditions for the Fluorescent X-Ray Analyzer>
  Apparats: ZSX100e manufactured by Rigaku Denki Co.
  Measuring conditions:
  Objects to be measured Zr—Kα ray, P—Kα ray
  Diameter of measurement 10 mm
  X-ray for measurement Rh (4.0 kw) 50 kv
  72 mA (2 θ=0 to 90)
  Surface of film measured measured by causing the X-ray to fall on the surface where the barrier coating was applied.

[X-Ray Photoelectron Spectroscopy]

As a method of evaluating the state of chemical bonds of the elements contained in the gas-barrier laminates prepared in Examples and Comparative Examples, the surface of the sample was irradiated with the X-ray and the produced photoelectrons were measured for their energy to analyze the elements constituting the sample and the state of electrons. The nitrogen element and the zirconium element were analyzed by using the commercially available X-ray photoelectron spectroscope. Bond energies of the elements obtained from the measurement of the gas-barrier laminates were analyzed with the peak position of $Zr3d_{5/2}$ as 185.0, and the bonded states of the nitrogen element in the films were evaluated. The numerical value of $Zr3d_{5/2}$ for correcting the peak was from a document J. Inorg. Nucl. Chem. Vol. 43, No. 12, pp. 3329-3334, 1981.

<Measuring Conditions for the X-Ray Photoelectron Spectroscope>
  Apparatus: K-ALPHA, manufactured by Thermo Fisher SCIENTIFIC Co.
  Measuring conditions:
  Elements to be measured Zr3d, N1s
  Peak correction $Zr3d_{5/2}$: 185.0
  X-ray species Al monochrometer
  Ion Gun ion energy 6000 eV
  Ar gas cluster
  cluster size small
  Etch phases number of levels 50,
  time per level (s) 30
  Pass energy 150.0 eV
  Diameter of measurement 400 μm
  Surface of film measured surface where the barrier coating was applied Table 1 shows the measured results and evaluated results of Examples, Comparative Examples and Reference Example.

TABLE 1

| Sample | Metal oxide (NV = 10%) Species | Amount (g) | Phosphoric acid compound Species | Amount (g) | Peptizer Species | Amount (g) | Additive (NV = 10%) Species | Amount (g) | Amount (g/m²) | Drying time (° C.-min) |
|---|---|---|---|---|---|---|---|---|---|---|
| Example 1 | ZSL-10T | 21.9 | 85% phosphoric acid | 3.5 | 1 mol/L nitric acid | 5.36 | PAA-25 | 1.64 | 0.8 | 220-10 |
| Example 2 | ↓ | ↓ | ↓ | 3.5 | ↓ | ↓ | PAA-01 | ↓ | 1.1 | ↓ |
| Example 3 | ↓ | ↓ | 75% phosphoric acid | 3.2 | ↓ | ↓ | PAA-25 | ↓ | 0.7 | ↓ |
| Example 4 | ↓ | ↓ | ↓ | 3.5 | ↓ | ↓ | ↓ | ↓ | 0.5 | ↓ |
| Example 5 | ↓ | ↓ | ↓ | 3.6 | ↓ | ↓ | ↓ | ↓ | 0.7 | ↓ |
| Example 6 | ↓ | ↓ | ↓ | 4.1 | ↓ | ↓ | ↓ | ↓ | 1.1 | ↓ |
| Example 7 | ↓ | ↓ | 85% phosphoric acid | 3.5 | ↓ | ↓ | PEI | 3.28 | 1.1 | ↓ |
| Example 8 | ↓ | ↓ | ↓ | 3.5 | ↓ | ↓ | Gly | 3.28 | 1.1 | ↓ |
| Example 9 | ↓ | ↓ | ↓ | 3.5 | ↓ | ↓ | D-Arg | 3.28 | 1.1 | ↓ |
| Example 10 | ↓ | ↓ | ↓ | 3.5 | ↓ | ↓ | L-Arg | 3.28 | 1.0 | ↓ |
| Example 11 | ↓ | ↓ | ↓ | 3.5 | ↓ | ↓ | PAA-25 | 1.64 | 1.1 | ↓ |
| Example 12 | ZSL-00120A | ↓ | ↓ | 1.5 | ↓ | ↓ | ↓ | ↓ | 0.8 | ↓ |
| Comp. Ex. 1 | ZSL-10T | 21.9 | 85% phosphoric acid | 3.5 | 1 mol/L nitric acid | 2.68 | — | — | 1.1 | 220-10 |
| Comp. Ex. 2 | ↓ | ↓ | ↓ | 4.1 | ↓ | ↓ | — | — | 1.1 | ↓ |
| Comp. Ex. 3 | ZSL-00120A | ↓ | ↓ | 2.5 | ↓ | 5.36 | — | — | 1.0 | ↓ |
| Ref. Ex. 1 | laminated film without barrier (12 μm PET/50 μm CPP) | | | | | | | | | |

| Sample | Oxygen permeability (cc/m²·day·atm) (40° C.-90% RH) | Water vapor permeability (g/m²·day) (40° C.-90% RH) | Optical property TT (%) | Hz (%) | Infrared absorption spectrum Max. absorption wave number (cm⁻¹) | Fluorescent X-ray evaluation P/Zr | X-ray photoelectron spectroscopy N1s bond energy (eV) |
|---|---|---|---|---|---|---|---|
| Example 1 | 0.3 | 2.2 | 91 | 14 | 1018 | 6.6 | 404 |
| Example 2 | 0.6 | 0.9 | 93 | 16 | 1036 | 6.5 | 404 |
| Example 3 | 0.7 | 1.0 | 91 | 13 | 1033 | 6.3 | 404 |
| Example 4 | 0.3 | 1.9 | 91 | 10 | 1035 | 7.8 | 404 |
| Example 5 | 0.2 | 0.5 | 91 | 13 | 1019 | 7.1 | 404 |
| Example 6 | 0.1 | 3.8 | 91 | 12 | 1034 | 8.0 | 404 |
| Example 7 | 0.2 | 1.7 | 91 | 24 | 1017 | 6.0 | 403 |
| Example 8 | 1.4 | 1.6 | 91 | 27 | 1019 | 6.1 | 403 |
| Example 9 | 0.3 | 1.0 | 91 | 15 | 1020 | 6.4 | 402 |
| Example 10 | 1.1 | 1.5 | 91 | 17 | 1031 | 6.3 | 402 |
| Example 11 | 1.0 | 1.6 | 91 | 26 | 1017 | 6.5 | 404 |
| Example 12 | 0.4 | 0.6 | 90 | 16 | 1041 | 2.8 | 404 |
| Comp. Ex. 1 | 21 | 3.8 | 92 | 26 | 1032 | 6.3 | — |
| Comp. Ex. 2 | 1.0 | 3.9 | 92 | 27 | 1030 | 7.6 | — |
| Comp. Ex. 3 | 21 | 5.8 | 91 | 26 | 1033 | 4.4 | — |
| Ref. Ex. 1 | 200 | 6.0 | 83 | 24 | — | — | — |

ABBREVIATIONS IN TABLE 1

ZSL-10T: amorphous zirconium oxide
ZSL-00120A: crystalline zirconium oxide
$HNO_3$: nitric acid
PAA: polyallylamine
PEI: polyethyleneimine
Gly: glycine
Arg: alginine
TT: total ray transmittivity
Hz: haze
P/Zr: ratio of contents of the phosphorus element (P) from the phosphoric acid compound and the zirconium element (Zr) in the metal oxide in the film
In Table 1, symbol "–" stands for "not added", "not carried out", "not detected", etc.

INDUSTRIAL APPLICABILITY

The gas-barrier coating composition of the present invention makes it possible to form a film that features excellent oxygen-barrier property and water vapor-barrier property, and can be favorably used as a material for producing transparent packages having high barrier property.

DESCRIPTION OF REFERENCE NUMERALS 1 base material 2 anchor layer
3 gas-barrier layer (gas-barrier film)
4 moisture-proof resin layer
The invention claimed is:

1. A gas-barrier laminate comprising:
a base material; and
disposed on the base material, a film of a gas-barrier coating composition obtained by crosslinking a metal oxide, a phosphoric acid compound, and an amine compound, wherein
the amine compound is at least one selected from the group consisting of a polyamine compound, an amino sugar compound, and an amino acid compound.
2. The gas-barrier laminate according to claim 1, wherein the film has such an absorption peak that an infrared absorption becomes maximal over a range of 1000 to 1050 $cm^{-1}$ in an infrared absorption spectrum thereof.

3. The gas-barrier laminate according to claim 1, wherein the film has such a peak that the bond energy of N becomes maximal over a range of 400 to 405 eV as measured by an XPS.

4. The gas-barrier laminate according to claim 1, wherein an anchor layer is provided between the base material and the film.

5. The gas-barrier laminate according to claim 1, wherein the amount of oxygen permeation is not more than 25 cc/m$^2$·day·atm (40° C.90% RH) and the amount of water vapor permeation is not more than 5.5 g/m$^2$·day (40° C.90% RH) when the base material is a 12 μm-thick biaxially stretched polyester, the film is formed in an amount of 1.0 g/m$^2$ on the base material, and a 50 μm-thick unstretched polypropylene film is arranged on the film.

6. The gas-barrier laminate composition according to claim 1, wherein the metal oxide is a zirconium oxide.

7. The gas-barrier laminate composition according to claim 1, wherein the phosphoric acid compound is at least one of an orthophosphoric acid, a metaphosphoric acid, a polyphosphoric acid, and a cyclic polyphosphoric acid.

\* \* \* \* \*